United States Patent Office 2,918,489
Patented Dec. 22, 1959

2,918,489

GEMINAL DINITRO COMPOUNDS AND METHOD OF PREPARING SAME

Marvin H. Gold, Pasadena, Calif., and Levonna Herzog, Rutherford, N.J., assignors, by mesne assignments, to Aerojet-General Corporation, Cincinnati, Ohio, a corporation of Ohio No Drawing. Application November 30, 1950
Serial No. 198,491

15 Claims. (Cl. 260—465.4)

This invention relates to new compositions of matter and to a method of preparing them. In particular, this invention relates to a new class of geminal dinitro compounds having the general formula:

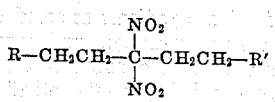

wherein R and R' are nitrile, acetyl, carboxylic acid, alkyl carboxylate, aryl carboxylate, metal carboxylate, ammonium carboxylate, amido, sulfonyl, alkyl sulfonyl, aryl sulfonyl, metal sulfonyl, ammonium sulfonyl, sulfonic acid, alkyl sulfonate, aryl sulfonate, metal sulfonate or ammonium sulfonate radicals.

The new compositions of our invention are conveniently prepared by reacting an unsaturated compound having the general formula:

$$H_2C=CH-R$$

wherein R is as defined above, with an alkali metal, alkaline earth metal, ammonium, alkyl ammonium, aryl ammonium or alkyl aryl ammonium aci-salt of a geminal dinitro compound having the structural formula:

wherein X and Y are the same or different and are hydrogen or lower hydroxyalkyl radicals.

The reaction can be described in general as a Michael type reaction. The aci-salts can be prepared in advance or can be produced in situ by conducting the reaction in the presence of a suitable base.

Examples of materials useful as the unsaturated compound in the practice of our invention are acrylic acid, acrylonitrile, methyl acrylate, ethyl acrylate, phenyl acrylate, ammonium acrylate, sodium acrylate, acrylamide, normally substituted acrylamides, methyl vinyl ketone, methyl vinyl sulfone, methyl vinyl sulfonate, and phenyl vinyl sulfonate, etc.

Examples of the dinitro compounds useful in the practice of our invention are calcium dinitromethane, magnesium dinitromethane, barium dinitromethane, etc., the N-substituted ammonium salts of dinitromethane such as trimethyl ammonium, triethyl ammonium, tributyl ammonium, trimethyl benzyl ammonium, trimethyl cetyl ammonium, methyl ethyl propyl benzyl ammonium, etc., as well as the methylol derivatives of the above compounds such as the potassium dinitroethanol or 2,2-dinitro-1,3-propanediol salts. The methylol derivatives are generally safer and easier to prepare than dinitromethane and can be stored for a considerable period of time without undergoing any change. The alkali metal salts of dinitro compounds are preferred for their safety in handling.

The following examples are presented to more clearly illustrate our invention.

EXAMPLE I

*Preparation of 4,4-dinitro-1,7-heptanedinitrile*

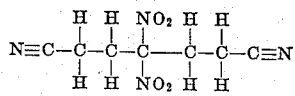

from potassium dinitromethane and acrylonitrile.

A three-necked flask is fitted with a thermometer, dropping funnel and stirrer. Within the flask are placed 150 grams (.8 M) of potassium dinitromethane and 500 cc. of water. The mixture is warmed to 35° C. and 135 grams (2.5 M) of acrylonitrile is added through the dropping funnel. After the addition has been completed, the mixture is continuously stirred for several hours. The aqueous solution is extracted several times with ether and the ether extracts combined. The ether is removed from the extracted material leaving the 4,4-dinitro-1,7-heptanedinitrile as a substantially colorless crystalline solid. This compound may be purified by recrystallizing it from ethanol and shows a melting point from 77°–78° C. The calculated nitrogen content for the compound $C_7H_8N_4O_4$ is 26.4% nitrogen. The nitrogen content determined by analysis of the compound showed 26.53% nitrogen. The yield of 4,4-dinitroheptanedinitrile based on the amount of potassium dinitromethane was 34%.

EXAMPLE II

*Formation of dimethyl 4,4-dinitro-1,7-heptanedioate*

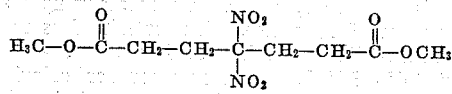

A. FROM POTASSIUM DINITROMETHANE

A three-necked flask is fitted with a stirrer, a thermometer and dropping funnel. 87 grams (.5 M) of potassium dinitromethane and 550 cc. of water are added to the flask. The temperature of the reaction mixture is maintained between 35°–45° C. while 232 grams (2.7 M) of methyl acrylate is added. Stirring is continued for three hours after the addition is completed. The reaction mixture, which at first is bright yellow in color, gradually becomes darker and at the end of the reaction is almost black. The mixture is extracted with ether, the ether extracts combined and treated with decolorizing charcoal. The ether is removed by evaporation and the residue is crystallized from methanol. 84 grams of colorless crystals of dimethyl 4,4-dinitro-1,7-heptanedioate, having a melting point of 43.5°–44.5°, is obtained. This yield is approximately 64% based on the weight of potassium dinitromethane. The calculated nitrogen content for the compound $C_9H_{14}O_8N_2$ is N—10.07%. The amount of N found by analysis is N—9.91%.

B. FROM POTASSIUM DINITROETHANOL

To a three-necked flask fitted with a stirrer, thermometer and dropping funnel is added 524 grams (2.5 M) potassium dinitroethanol (analyzed as 83% pure) dissolved in 2750 ml. of water. The mixture is stirred vigorously at room temperature. 1250 ml. (13.5 M) of methyl acrylate is added gradually to the aqueous solution over a period of three hours. During the addition of the methyl acrylate a temperature rise is observed which approaches 45° C. Stirring is continued for eight additional hours after all of the methyl acrylate has been added. When stirring is discontinued, the organic layer separates out at the bottom of the flask. The ester is then dissolved in 400 ml. of ether and treated with several grams of decolorizing charcoal. The mixture is allowed to stand over the charcoal a half hour. The solution is then filtered and the ether is stripped off by evaporation under reduced pressure. The oily residue that is left behind is placed in solution with 400 ml. of methanol and cooled to induce crystallization. The white colorless crystalline product which results from the crystallization is dimethyl 4,4-dinitro-1,7-heptanedioate, and has a melting point of about 45° C. This reaction yields approximately 58% of theoretical based on the amount of the potassium dinitroethanol used.

C. FROM 2,2-DINITRO-1,3-PROPANEDIOL

To a well-stirred mixture of 300 grams (1.8 M) of 2,2-dinitro-1,3-propanediol, 20.2 grams of (3.6 M) of potassium hydroxide and 4000 cc. of water that has been warmed to 45° is added 610 grams (7 M) of methyl acrylate. After the reaction has been completed which normally takes about eight hours total time, the mixture is allowed to cool and the dimethyl-4,4-dinitro-1,7-heptanedioate, which has crystallized out, is separated by filtration, washed and dried. The melting point of this compound is approximately 44° C.–45° C.

EXAMPLE III

*Preparation of 4,4-dinitro-1,7-heptanedioic acid*

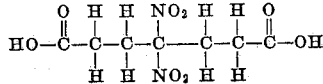

A mixture of 127 grams (.45 M) of crude dimethyl-4,4-dinitroheptane-1,7-dioate is mixed with one liter of 18% hydrochloric acid and the mixture refluxed for two hours until the solution has become homogeneous. Upon cooling the product is allowed to crystallize. The solid material is filtered off, treated with decolorizing charcoal and crystallized from water. The material thus obtained is 4,4-dinitro-1,7-heptanedioic acid, and has a melting point of 136°–137° C. Based on theoretical calculations, the equivalent weight of 4,4-dinitroheptanedioic acid that should be obtained would be 125 grams. The actual equivalent weight determined by experiment was 125.5 to 126 grams. The calculated nitrogen content for the compound $C_7H_{10}N_2O_8$ is 11.19% nitrogen. The nitrogen content determined by an analysis of the compound was found to be 10.83% nitrogen. The calculated heat of combustion was 3010 cal./gm. The heat of combustion found was 3060 cal./gm.

$D_{20}^{25}$ crystals = 1.52

By our invention we have made available a series of useful compounds which may be employed as intermediates for the synthesis of a large number of compounds heretofore unknown in the art. These compounds may be employed as plasticizers, pharmaceuticals, or are useful compounds for incorporating in rocket propellant charges. These compounds likewise may be employed to produce a large number of derivatives from which a vast number of ultimate new compounds may be obtained.

We claim:

1. As new compositions of matter the geminal dinitro compounds having the general formula:

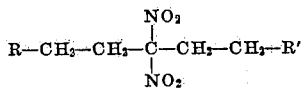

wherein R and R' are radicals selected from the group consisting of cyano, carboxyl, and lower carboalkoxy radicals.

2. As new compositions of matter, the geminal dinitro compounds having the general formula:

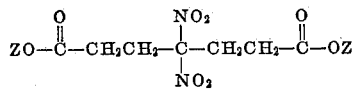

wherein Z is a lower alkyl radical.

3. A new composition of matter having the formula

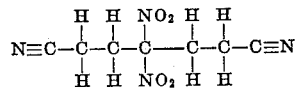

4. A new composition of matter having the formula

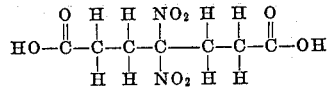

5. A new composition of matter having the formula

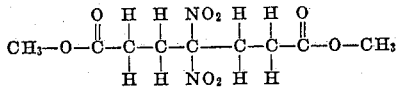

6. The method of preparing geminal dinitro compounds having the general formula:

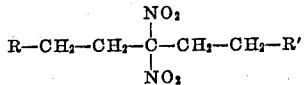

wherein R and R' are radicals selected from the group consisting of cyano, carboxyl, and lower carboalkoxy radicals; which comprises condensing an aci-salt selected from the group consisting of the alkali metal, alkaline earth metal, ammonium, lower alkyl ammonium and tri lower alkyl benzyl ammonium salts of a geminal dinitro compound having the general formula:

wherein X and Y are radicals selected from the group consisting of hydrogen and lower alkanol radicals, with an olefin selected from the group consisting of lower alkyl acrylates, acrylic acid, and acrylonitrile.

7. The method of claim 6 wherein said aci-salt is generated in situ.

8. The method of preparing geminal dinitro compounds having the general formula:

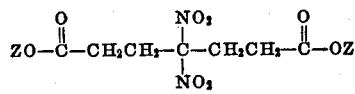

wherein Z is a lower alkyl radical, which comprises condensing an alkali metal aci-salt of dinitromethane with a lower alkyl acrylate.

9. The method of preparing 4,4-dinitro-1,7-heptane dinitrile which comprises reacting acrylonitrile with potassium dinitromethane.

10. The process of forming 4,4-dinitro-1,7-heptanedinitrile which comprises slowly adding to an aqueous solution of potassium dinitromethane, acrylonitrile, continuously stirring the mixture during addition and for several hours after addition has been completed, extracting the aqueous solution with ether, combining the ether extracts and removing the ether by evaporation.

11. The method of preparing dimethyl-4,4-dinitro-1,7-heptanedioate which comprises condensing potassium 2,2-dinitroethanol and methyl acrylate.

12. A method of forming dimethyl 4,4-dinitro-1,7-heptanedioate which comprises mixing into a water solution of a potassium salt of 2,2-dinitroethanol, methyl acrylate, continuously stirring after addition has been completed, extracting the aqueous mixture with ether, combining the ether extracts and removing the ether by evaporation and crystallizing the residue.

13. The method of preparing dimethyl-4,4-dinitro-1,7-heptanedioate which comprises condensing 2,2-dinitro-1,3-propanediol and methyl acrylate in the presence of aqueous potassium hydroxide.

14. A method of forming dimethyl 4,4-dinitro-1,7-heptanedioate which comprises mixing into a water solution of 2,2-dinitro-1,3-propanediol, methyl acrylate, and potassium hydroxide, continuously stirring after addition has been completed and extracting the aqueous mixture with ether, combining the ether extracts and removing the ether by evaporation and crystallizing the residue.

15. The method of preparing dimethyl-4,4-dinitro-1,7-heptanedioate which comprises condensing potassium dinitromethane and methyl acrylate.

References Cited in the file of this patent

UNITED STATES PATENTS

| | | |
|---|---|---|
| 2,328,370 | Wiest | Aug. 31, 1943 |
| 2,342,119 | Bruson | Feb. 22, 1944 |
| 2,361,259 | Bruson | Oct. 24, 1944 |
| 2,396,626 | Wiest et al. | Mar. 12, 1946 |
| 2,460,536 | Rogers | Feb. 1, 1949 |

FOREIGN PATENTS

| | | |
|---|---|---|
| 728,531 | Germany | Dec. 1, 1942 |

OTHER REFERENCES

Hass et al.: Chem. Reviews, vol. 32, p. 416 (1943).

Klager: J. of Organic Chemistry, vol. 16, pp. 161–169 (1951).